United States Patent
Malboubi et al.

(10) Patent No.: US 12,457,156 B2
(45) Date of Patent: Oct. 28, 2025

(54) METHODS, SYSTEMS, AND DEVICES FOR SCALABLE AND LAYERED ARCHITECTURE FOR REAL-TIME KEY PERFORMANCE INDICATOR (KPI) PREDICTION IN MOBILE NETWORKS

(71) Applicant: AT&T Intellectual Property I, L.P., Atlanta, GA (US)

(72) Inventors: Mehdi Malboubi, San Ramon, CA (US); Eric Jung, Castro Valley, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 374 days.

(21) Appl. No.: 17/992,498

(22) Filed: Nov. 22, 2022

(65) Prior Publication Data
US 2024/0171479 A1    May 23, 2024

(51) Int. Cl.
*H04L 41/5009* (2022.01)
*H04B 7/06* (2006.01)

(52) U.S. Cl.
CPC ....... *H04L 41/5009* (2013.01); *H04B 7/0632* (2013.01)

(58) Field of Classification Search
CPC .......................... H04L 41/5009; H04B 7/0632
See application file for complete search history.

(56) References Cited

U.S. PATENT DOCUMENTS

| | | | |
|---|---|---|---|
| 9,439,081 B1* | 9/2016 | Knebl | G06N 20/00 |
| 10,693,575 B2* | 6/2020 | Jana | H04B 17/3913 |
| 11,063,842 B1* | 7/2021 | Vasseur | G06N 5/01 |
| 12,167,264 B1* | 12/2024 | McEvilly | H04L 43/0876 |
| 2016/0379243 A1* | 12/2016 | Kalish | G06Q 30/0242 705/14.41 |
| 2016/0379244 A1* | 12/2016 | Kalish | G06Q 30/0242 705/14.41 |
| 2017/0290024 A1* | 10/2017 | Ouyang | H04L 41/0896 |
| 2018/0089956 A1* | 3/2018 | Nagaragatta | G07F 17/3293 |
| 2018/0143891 A1* | 5/2018 | Polisetty | G06F 9/542 |
| 2019/0236497 A1* | 8/2019 | Santos | G06F 17/18 |
| 2020/0034873 A1* | 1/2020 | Poynter | G06Q 30/0244 |

(Continued)

FOREIGN PATENT DOCUMENTS

| | | | | |
|---|---|---|---|---|
| CN | 110796366 A | * | 2/2020 | |
| CN | 112218263 A | * | 1/2021 | H04W 4/40 |

(Continued)

*Primary Examiner* — Shean Tokuta
(74) *Attorney, Agent, or Firm* — Guntin & Gust, PLC; Mark Wilinski

(57) ABSTRACT

Aspects of the subject disclosure may include, for example, receiving a request from a mobile network entity for a key performance indicator (KPI) prediction over a portion of a mobile network, and obtaining a group of identifiers associated with the mobile network entity. Further embodiments can include obtaining a group of KPIs associated with the mobile network entity based on the group of identifiers, and determining a KPI prediction associated with the mobile network entity based on the group of KPIs. Additional embodiments can include allocating a group of network resources to the mobile network entity based on the KPI prediction. Other embodiments are disclosed.

20 Claims, 15 Drawing Sheets

(56) References Cited

U.S. PATENT DOCUMENTS

| | | | |
|---|---|---|---|
| 2020/0252147 A1* | 8/2020 | Jana | H04B 17/373 |
| 2021/0160147 A1* | 5/2021 | Chou | H04L 43/08 |
| 2022/0121968 A1* | 4/2022 | Chandak | G06N 3/006 |
| 2022/0188843 A1* | 6/2022 | Michalsky | G06N 20/00 |
| 2022/0268945 A1* | 8/2022 | Perriam | G01S 19/27 |
| 2023/0262520 A1* | 8/2023 | Sarkar | H04B 7/0617 |
| | | | 370/235 |
| 2024/0171479 A1* | 5/2024 | Malboubi | H04B 7/0632 |
| 2025/0139697 A1* | 5/2025 | Carlough | G06Q 40/03 |

FOREIGN PATENT DOCUMENTS

| | | | | |
|---|---|---|---|---|
| CN | 112529204 A * | 3/2021 | | G06F 11/3428 |
| CN | 112534778 A * | 3/2021 | | H04L 41/147 |
| WO | WO-2021047359 A1 * | 3/2021 | | G01C 21/30 |
| WO | WO-2021146923 A1 * | 7/2021 | | |
| WO | WO-2022225714 A1 * | 10/2022 | | H04L 41/0816 |

* cited by examiner

METHODS, SYSTEMS, AND DEVICES FOR SCALABLE AND LAYERED ARCHITECTURE FOR REAL-TIME KEY PERFORMANCE INDICATOR (KPI) PREDICTION IN MOBILE NETWORKS

FIELD OF THE DISCLOSURE

The subject disclosure relates to methods, systems, and devices for scalable and layered architecture for real-time key performance indicator (KPI) prediction in mobile networks.

BACKGROUND

Traditionally, user end (UE) device-level KPIs are predicted using per UE machine learning (ML)/artificial intelligence (AI) models. This approach is not scalable in large-scale mobile networks that include tens of millions of user end devices or communication devices due to limited amount of compute resources and high cost of developing/maintaining ML/AI models per UEs or communication devices. In addition, traditional approaches are not able to provide KPI predictions for UEs or communication devices without historical KPI values such as newly deployed UEs or communication devices.

BRIEF DESCRIPTION OF THE DRAWINGS

Reference will now be made to the accompanying drawings, which are not necessarily drawn to scale, and wherein.

DETAILED DESCRIPTION

Figure 1:
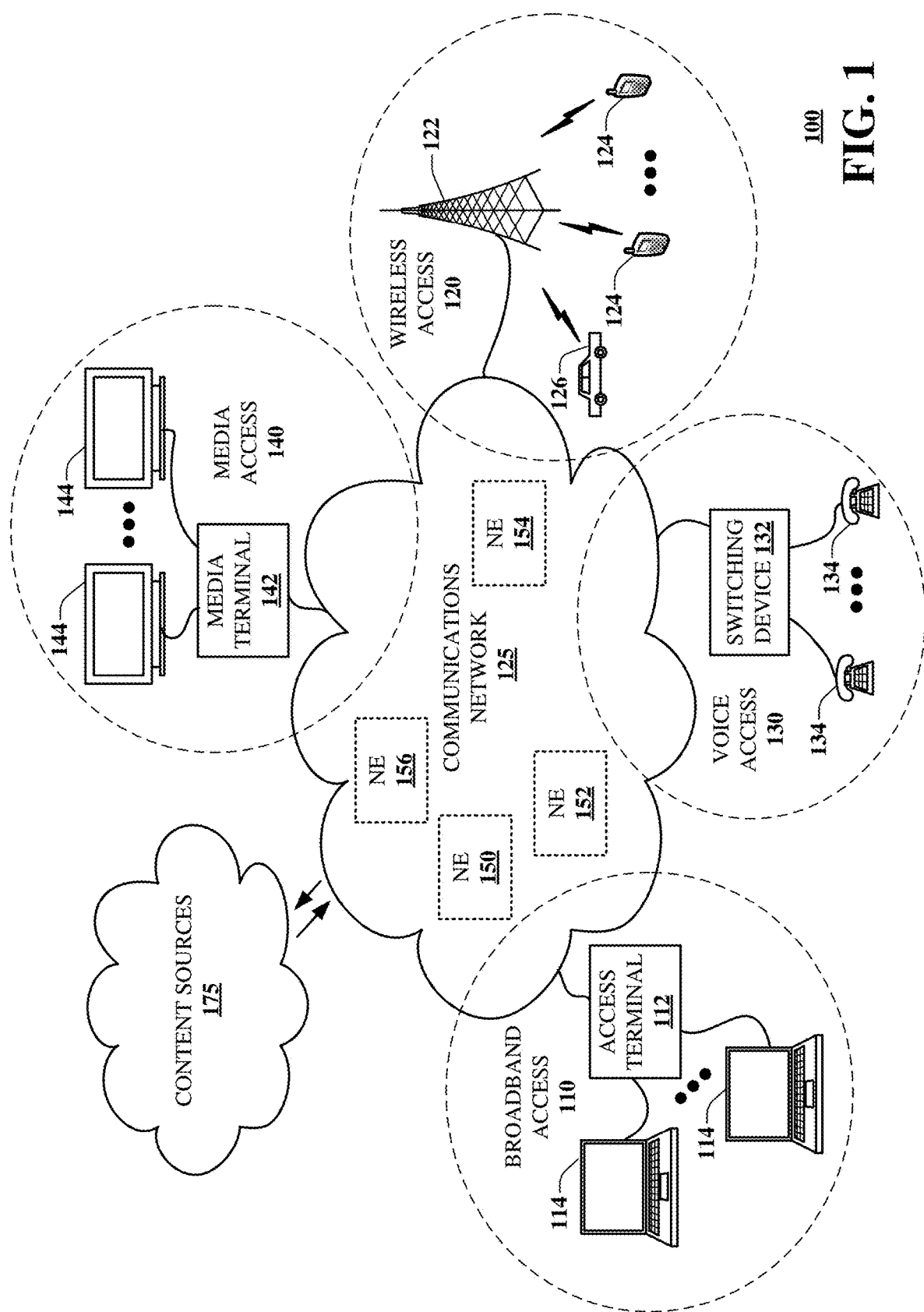
FIG. 1 is a block diagram illustrating an exemplary, non-limiting embodiment of a communications network in accordance with various aspects described herein.

The subject disclosure describes, among other things, illustrative embodiments for receiving a request from a mobile network entity for a key performance indicator (KPI) prediction over a portion of a mobile network, and obtaining a group of identifiers associated with the mobile network entity. Further embodiments can include obtaining a group of KPIs associated with the mobile network entity based on the group of identifiers, and determining a KPI prediction associated with the mobile network entity based on the group of KPIs. Additional embodiments can include allocating a group of network resources to the mobile network entity based on the KPI prediction. Other embodiments are described in the subject disclosure.

One or more aspects of the subject disclosure include a device, comprising a processing system including a processor, and a memory that stores executable instructions that, when executed by the processing system, facilitate performance of operations. The operations can comprise receiving a request from a mobile network entity for a key performance indicator (KPI) prediction over a portion of a mobile network, and obtaining a group of identifiers associated with the mobile network entity. Further operations can comprise obtaining a group of KPIs associated with the mobile network entity based on the group of identifiers, and determining a KPI prediction associated with the mobile network entity based on the group of KPIs. Additional operations can comprise allocating a group of network resources to the mobile network entity based on the KPI prediction.

One or more aspects of the subject disclosure include a non-transitory, machine-readable medium, comprising executable instructions that, when executed by a processing system including a processor, facilitate performance of operations. The operations can comprise receiving a request from a mobile network entity for a key performance indicator (KPI) prediction over a portion of a mobile network, and obtaining a group of identifiers associated with the mobile network entity. Further operations can comprise obtaining a group of historical KPIs associated with the mobile network entity based on the group of identifiers, and determining a KPI prediction associated with the mobile network entity based on the group of KPIs utilizing least square estimation. Additional operations comprise allocating a group of network resources to the mobile network entity based on the KPI prediction.

One or more aspects of the subject disclosure include a method. The method can comprise receiving, by a processing system including a processor, a request from a mobile network entity for a key performance indicator (KPI) prediction over a portion of a mobile network, and obtaining, by the processing system, a group of identifiers associated with the mobile network entity. Further, the method can comprise obtaining, by the processing system, a group of KPIs associated with the mobile network entity based on the group of identifiers, and determining, by the processing system, a CQI prediction associated with the mobile network entity based on the group of KPIs. In addition, the method can comprise determining, by the processing system, a time period associated with the group of KPIs, and selecting, by the processing system, a time period predictor based on the time period from a short-term predictor and a long-term predictor resulting in a selected time period predictor. Also, the method can comprise determining, by the processing system, a time period KPI prediction associated with the mobile network entity utilizing the selected time period predictor based on the group of KPIs, and determining, by the processing system, cell-based KPI prediction associated with the mobile network entity based on the group of KPIs. Further, the method can comprise determining, by the processing system, a KPI prediction associated with the mobile network entity based on the CQI prediction, the time period KPI prediction, and the cell-based KPI prediction, and allocating, by the processing system, a group of network resources to the mobile network entity based on the KPI prediction.

Referring now to FIG. 1, a block diagram is shown illustrating an example, non-limiting embodiment of a system 100 in accordance with various aspects described herein. For example, system 100 can facilitate in whole or in part determining a KPI prediction associated with a mobile network entity and allocating network resources accordingly. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2H are block diagrams illustrating example, non-limiting embodiments of a system functioning within the communication network of FIG. 1 in accordance with various aspects described herein.

Reliable data/content delivery in mobile networks requires the ability to predict a KPI associated with a user end (UE) device in near real-time. In fact, per UE KPI predictions are important for many actions in mobile networks including optimal utilization of resources, application performance optimization and providing the best QoS for users at a particular time and location. Such capabilities are even more important in applications of Open Radio Access Network (ORAN) in which RAN-Intelligent-Controller/operators/users have more control on the operation of network equipment/devices and enables them to make more smart decisions based on the accurate prediction of the KPI. Making such decisions based on reported UE signal strength measurements is not effective as such UE measurement reports experience transmission delays, which makes applying required network resource allocation changes ineffective in mobile networks with highly dynamic environments. Moreover, with regard to KPI prediction for a UE utilizing ML/AI models, although may predict the KPI with a better accuracy, however, such a KPI prediction can be challenging to provide scalable per-UE KPI prediction models in dynamic networks with tens of millions of users (e.g. smart phones, Internet of Things (IoT) devices, etc.), due to limited amount of network resources (e.g., computing, bandwidth, etc.) and high cost of developing/maintaining ML/AI models per UEs.

Examining data related to KPI prediction leads to three observations: 1) many significant KPIs such as Downlink/Uplink Throughputs (DLT/ULT) contain both long and short temporal correlations that must be captured by different models (e.g., ML/AI/time series); 2) there are active UEs and UEs with very rare activities over time (per UE KPIs that show sparse behavior); and 3) the actual KPI values can be eventually observed and measured.

One or more embodiments address these observations such that they include scalable, layered architecture of network devices in large-scale networks to predict KPI that t take into account the above observations. Further embodiments use a hybrid approach that profiles/clusters UE behaviors per each cell/base station (or cluster of cells/base stations), accurately predicts the UE cluster, and fuse both cell-level predictions and per UE predictions, using a layered architecture as well as based on the latest temporal behavior of the KPI to be predicted. Such a scalable, layered architecture of a network devices can be used by network operators and application providers as well as service provides to predict per UE KPIs and improve Quality of Service (QoS)/Quality of Experience (QoE) for their users and making optimal decisions at particular times and locations, thereby generating revenue for mobile operators.

Figure 2A:
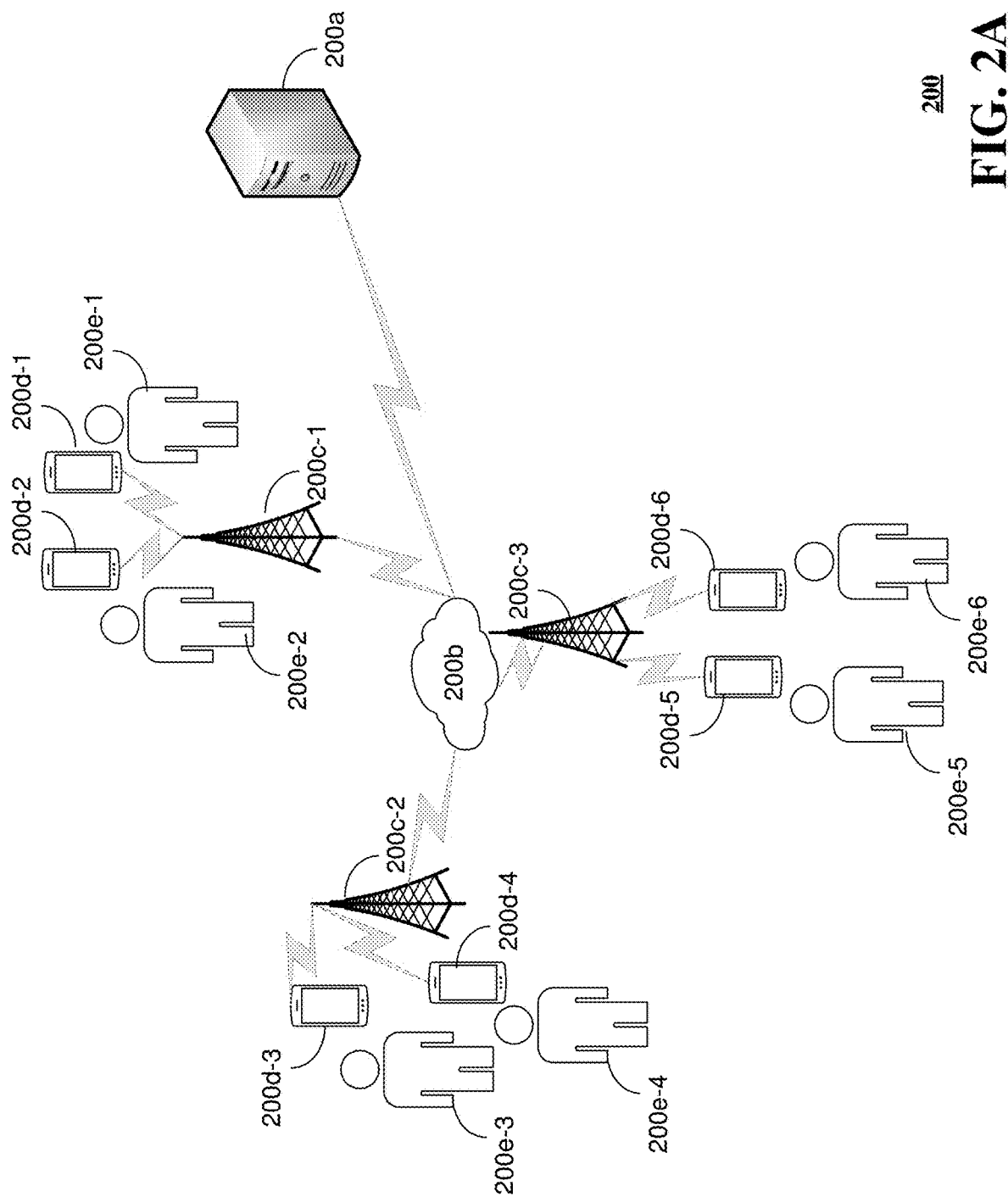
FIGS. 2A-2H are block diagrams illustrating example, non-limiting embodiments of a system functioning within the communication network of FIG. 1 in accordance with various aspects described herein.

Referring to FIG. 2A, in one or more embodiments, system 200 comprises a network device 200a communicatively coupled over a mobile network 200b to a base station 200c-1, base station 200c-2, and base station 200c-3. Further, user end device 200d-1 associated with user 200e-1 and user end device 200d-2 associated with user 200e-2 are communicatively coupled to base station 200c-1. In addition, user end device 200d-3 associated with user 200e-3 and user end device 200d-4 associated with user 200e-4 are communicatively coupled to base station 200c-2. Also, user end device 200d-5 associated with user 200e-5 and user end device 200d-6 associated with user 200e-6 are communicatively coupled to base station 200c-3. Each of user end device 200d-1, user end device 200d-2, user end device 200d-3, user end device 200d-4, user end device 200d-5, and user end device 200d-6 are communicatively coupled to network device 200a over their respective base station and mobile network 200b. Further, each user end device 200d-1, user end device 200d-2, user end device 200d-3, user end device 200d-4, user end device 200d-5, and user end device 200d-6 can be a communication device that comprises, but are not limited to, a mobile device, mobile phone, smart phone, tablet computer, wearable device, smartwatch, augmented reality device, virtual reality device, cross reality device, or a combination thereof. Network device 200a can comprise one or more servers in one location or spanning multiple locations, one or more virtual services in one location or spanning multiple locations, or one or more cloud servers. Mobile network can comprise one or more wireless communication networks, one or more wired communication networks, or a combination thereof.

In one or more embodiments, the network device 200a can receive a request from a mobile network entity for a KPI prediction over a mobile network 200b. A mobile network entity can be user end device, a base station, a group of user end devices, a group of base stations, or a combination thereof. In some embodiments, the mobile network entity can be a cluster of UEs, a cluster of cells/base stations, or a cluster of UEs and cells/base stations. Thus, an example of a mobile network entity can be user end device 200d-1, user end device 200d-2, and base station 200c-1. Another example of a mobile network entity can be user end device 200d-2, base station 200c-1, user end device 200d-3 and base station 200c-2. Further, the network device 200a can obtain a group of identifiers associated with the mobile network entity. The group of identifiers can comprise one or more International Mobile Subscriber Identities (IMSIs), one or more international mobile equipment identities (IMEIs), one or more physical cell identifiers, one or more of extended cell global identifiers (ECGIs), or a combination thereof. The network device 200a can obtain the identifier from each individual user end device of base station that is part of the mobile network entity or from a database associated with the mobile network 200b that stores the identifiers for the mobile network UEs and base stations. Further, the network device 200a can obtain one or more KPIs associated with the mobile network entity based on the group of identifiers. These KPIs can be obtained from a database associated with the mobile network 200b and can be for a specific time period. In addition, the network device 200a can determine a KPI prediction associated with the mobile network entity based on the group of KPIs. In some embodiments, the KPI prediction can be for a period of time in the future. Further embodiments in determining KPI predictions are discussed in describing FIG. 2B. Also, the network device 200a can allocate a group of network resources to the mobile network entity based on the KPI prediction. If the mobile network entity comprises user end device 200d-1, user end device 200d-2 and base station 200c-1, in some embodiments, such allocation of network resources can include allocating more bandwidth to base station for user end device 200d-1 and user end device 200d-2 (e.g., allocation more channels). In other embodiments, the network device 200a can instruct the base station 200c-1 to perform a handover of user end device 200d-2 to base station 200c-2, which may have more bandwidth to allocate to user end device 200d-2. In further embodiments, the network device 200a can instruct mobile operator personnel to deploy an additional base station to a location in proximity to base station 200c-1 to allocate more computing resources and bandwidth resources to user end device 200d-1 and user end device 200d-2. In additional embodiments, user end device 200d-1 and user end device 200d-2 may be viewing media content from a specific media content service provider. The network device 200a can instruct the media content server(s) associated with the media content service provider to reduce the quality of the video content so as to free up bandwidth for base station 200c-1 to allocate any of the freed bandwidth to other user end devices associated with base station 200c-1.

Figure 2B:
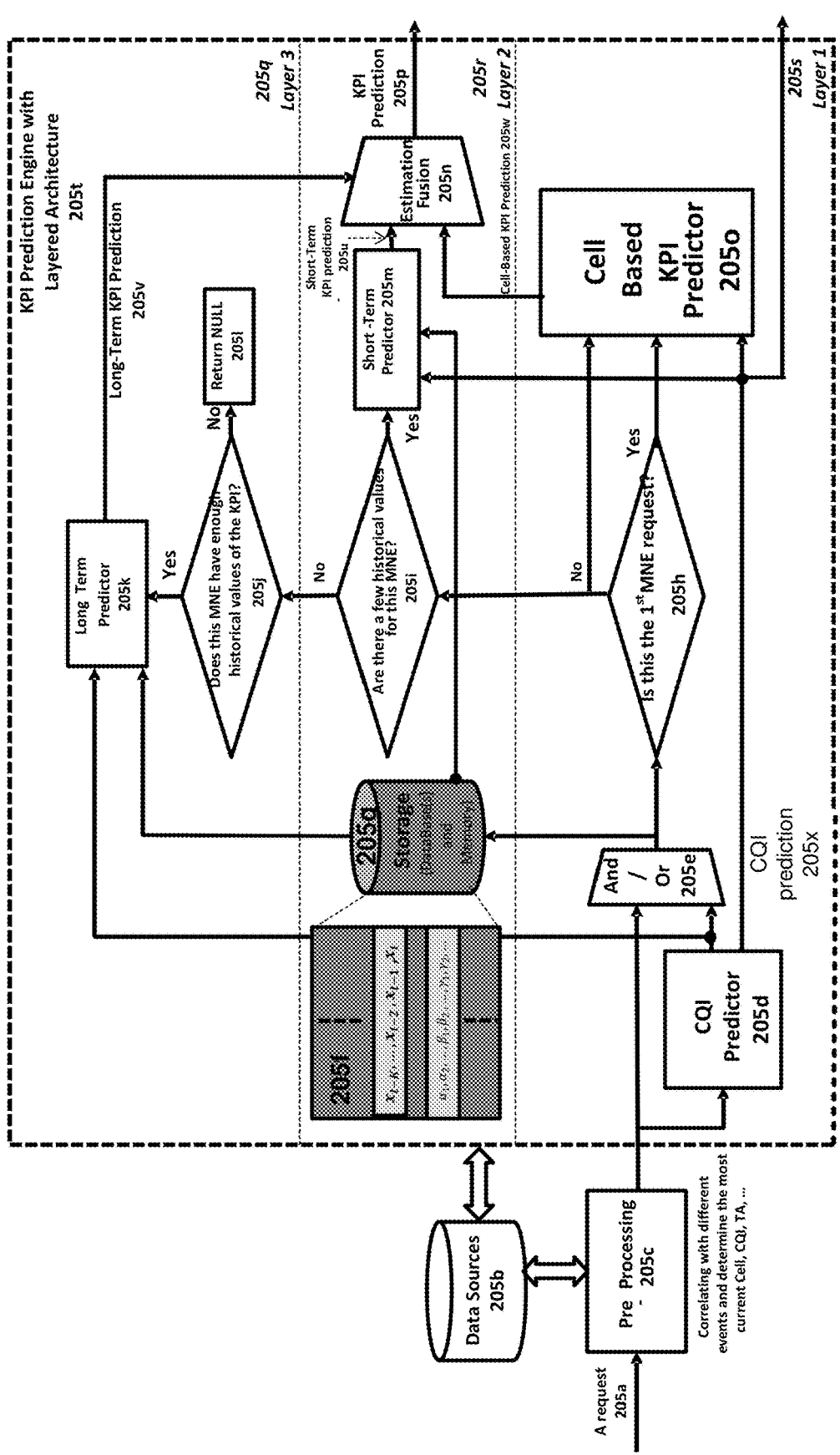

Referring to FIG. 2B, in one or more embodiments, system 205 comprises a KPI prediction engine 205t with layered architecture, as well as data sources database 205b and pre-processing engine 205c. Further, the network device 200a can comprise the KPI prediction engine 205t and/or the pre-processing engine 205c. A request 205a for a KPI prediction (e.g., Downlink/Uplink Throughputs (DLT/ULT)) of mobile network entity (e.g., a user end device, a cell, a base station, a cluster of user end devices, a cluster of cells, cluster of base stations, etc.) can be received by the pre-processing engine 205c. Further, the pre-processing engine 205c can extract some information (e.g., Channel Quality Indicator (CQI), reference signal receive power (RSRP)/reference signal receive quality (RSRQ), etc.) by correlating different events (using some keys/attributes such as time, IMSI, IMEI, PCI, EGCI, etc.) from different data sources database 205b.

Figure 2C:
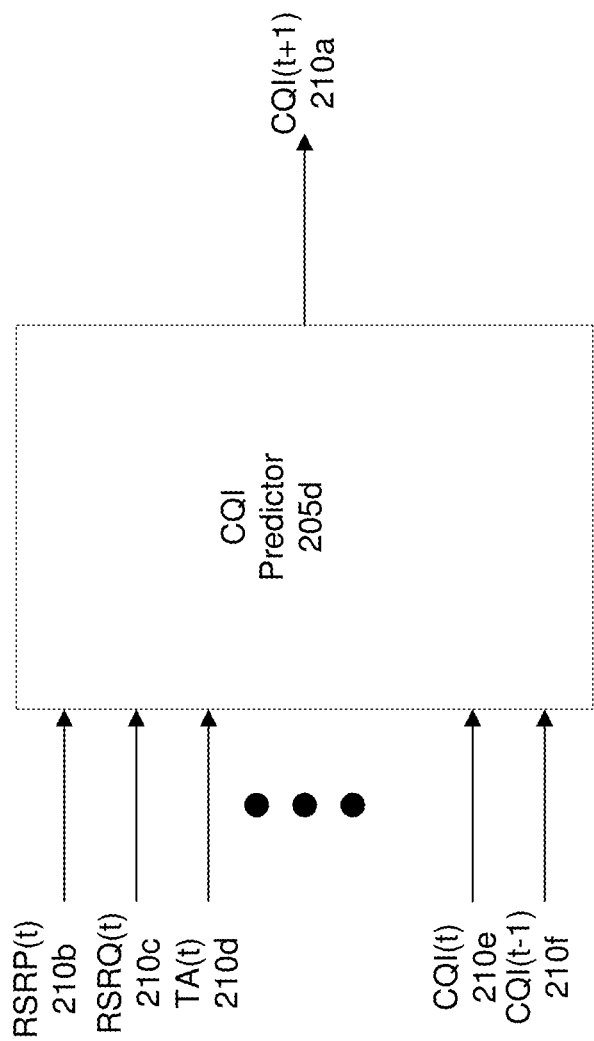

In one or more embodiments, based on the extracted information from the incoming request 205a, the KPI prediction for the mobile network entity is performed. In some embodiments, the KPI prediction for the mobile network entity can comprise a CQI prediction generated by the cluster (CQI) predictor. Referring to FIG. 2C, in one or more embodiments, the system 210 can comprise embodiments of the CQI predictor with several inputs that include historical KPI values such as RSRP(t) 210b, RSRQ(t) 210c, timing advance (TA)(t) 210d, CQI(t) 210e, and CQI(t−1) 210f as well as PUSCH-SINR, PUCCH-SINR and distance from the serving base station to a UE. Further, ML/AL/time-series models can be utilized as part of the CQI predictor 205d to generate a CQI prediction, CQI(t+1) 210a for mobile network entity. The CQI predictor 205d can predict fine grained CQIs (i.e., predicting exact discrete CQI values) or coarse grained CQIs (predicting discrete CQI values for each modulation schemes for example QPSK, 16QAM or 64 QAM) utilizing the ML/AL/time-series models. Due to the strong correlation between CQI and other KPIs (e.g., such as RSRP, RSRQ, etc.), the CQI prediction can be considered to be accurate. Such CQI predictions can be used to not only to allocate network resources but also by a mobile network operator in implementing mobile network applications, including estimating the achievable data rates for user end devices and optimal resource scheduling per each user end device, which are valuable for both the mobile network operator as well as service providers. In some embodiments, the CQI prediction can be made available to the personnel associated with the mobile network operator as well as the service provider utilizing a portal/graphical user interface or an application programming interface (API) to adjust network allocations (by mobile operators) or adjust services (by service providers).

Referring to FIG. 2B, in one or more embodiments, the storage module 205g can store historical KPIs values 205f (e.g., the last K values of the KPI, denoted by Xt-K, . . . , Xt-2, Xt-1 Xt, where K can vary based on the application and user/base station behavior) or the parameters of the prediction models (e.g. time series coefficients of an autoregressive integrated moving average (ARIMA) model, denoted by $\alpha1, \alpha2, \ldots \beta1, \beta2, \ldots \gamma1, \gamma2$, etc.). The storage can be implemented as realizations of different physical/virtual databases (DBs) (e.g., relational DBs, non-relational DBs, time-series DBs) or memory storage devices. Information stored in storage module 205g can be accessed from data sources database 205b.

In one or more embodiments, the multilayer architecture of the KPI prediction engine 205t provides the KPI prediction in the predetermined future time period (e.g., next x-seconds, next x-minutes, etc.). If the request is for a mobile network entity with no historical KPIs (e.g., Determining whether this the $1^{st}$ request for the mobile network entity (MNE) (or a portion thereof) 205h, or the first request for the MNE in this current cell in the las long time interval), the cell-based KPI predictor 205o is used for KPI prediction 205p. If there is short history of the KPI values (e.g., Are there a few historical values for this MNE (or a portion thereof?) 205i, there are a few historical KPIs in the cell), in addition to the cell-based KPI prediction 205w, a Short-Term Predictor 205m is used to generate a Short-Term KPI prediction 205u. This estimate can be fused (e.g., processed in combination) by an estimation fusion engine 205n with the cell-based KPI prediction 205w to provide a more accurate estimate of the KPI prediction 205p. If there are a long history of the KPI values (Does this MNE (or portion thereof) have enough historical values of KPI? 205j, there are long term historical vales for the MNE in the cell), in addition to the cell-based KPI prediction 205w, a Long-Term Predictor 205k is used to generate the Long-Term KPI prediction 205v. The Long-Term KPI prediction 205v can be fused by the estimation fusion engine 205n with the cell-based KPI prediction 205w and Short-Term KPI prediction 205u to provide a more accurate KPI prediction 205p. The KPI prediction engine 205t can be configured with one or more time thresholds to determine whether the time period associated with the historical KPI values are short-term or long-term. That is, if the time period associated with the historical KPI values are less than a time threshold, then the historical KPI values can be considered short-term. However, if the time period associated with the historical KPI values are greater than a time threshold, then the historical KPI values can be considered long-term Thus, the KPI prediction engine includes a multilayered architecture, with CQI KPI prediction 205x and cell-based KPI prediction 205w being generated in layer 1 205s, with Short-Term KPI prediction 205u being generated along with CQI KPI prediction 205x and cell-based KPI prediction 205w being generated in layer 2 205r, and with Long-Term KPI prediction 205v being generated along with Short-term KPI prediction 205u, CQI KPI prediction 205x and cell-based KPI prediction 205w being generated in layer 3 205q.

Figure 2D:
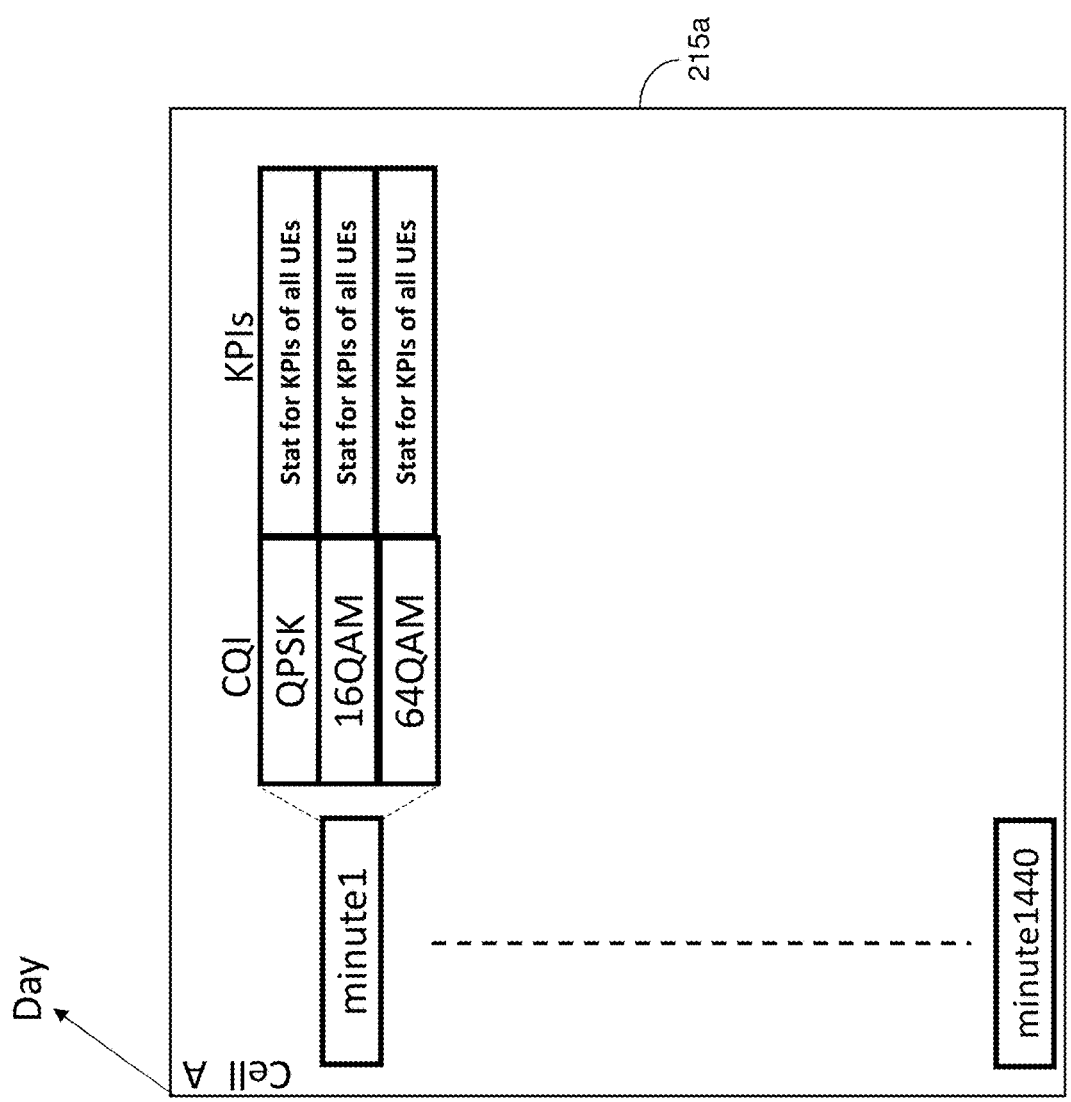

Referring to FIG. 2D, in one or more embodiments, the cell-based KPI predictor 205o can access KPIs 215a from the storage module 205g that includes minute by minute KPIs 215a for a base station across several days. (Minute by minute is one example. Other embodiments can have shorter or longer intervals). That is the KPIs 215a can include building a look-up table using the historical data. In such an embodiment and without loss of generality, in each cell, it can be found all user end devices communicatively coupled to the base station in each minute of a day (a day has 24*60=1440 minutes) over multiple days (i.e., duration of training data) with certain CQI associated with different modulation schemes (e.g., QPSK, 16QAM, 64QAM) and then compute statistics associated with the KPIs for all user end devices associated with the base station. Accordingly, when a request from a mobile network entity is received by the KPI prediction engine 205t, it determines the identifiers associated with the mobile network entity (e.g. IMSI, PCI, etc.), the current minute (i.e., the minute from the timestamp of the request) and computes the nearest historical CQI for that user. Accordingly, the KPI prediction engine 205t can find the correct bin (cell, minute, CQI, statistic) in the lookup table of that cell and the statistic can be used to generate KPI prediction for that request. The statistic can be computed using simple averaging or using another function such as mode or median, etc.

Figure 2E:
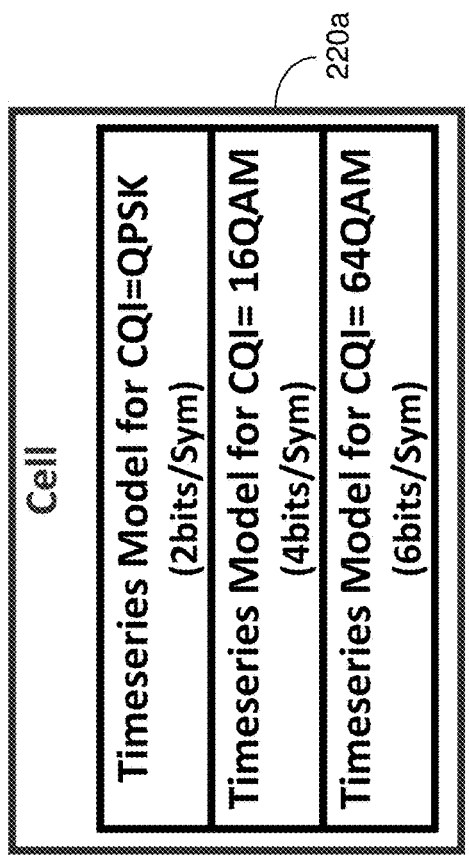
Figure 2E:
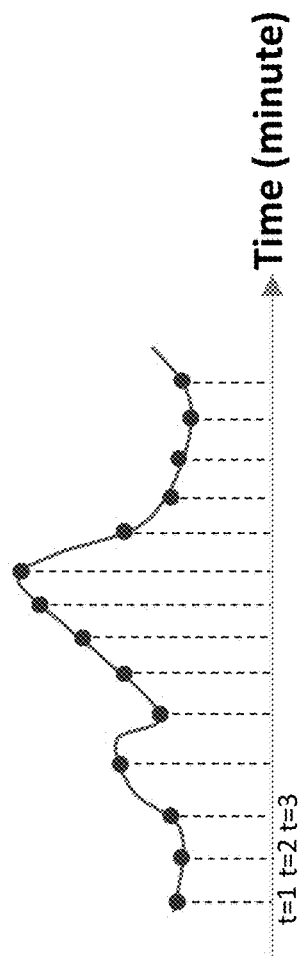

Referring to FIG. 2E, in one or more embodiments, for each cell/base station, the KPI prediction engine 205t can cluster all user end devices with certain CQI 220a associated with a modulation scheme (e.g., QPSK, 16QAM, 64QAM) and compute some statistics associated with the KPIs for each minute (e.g., average DLT for all user end devices for each minute of a day). Further, the KPI prediction engine 205t can sort such records of data for each CQI data over time, and generate a time-series model 220b representing the time-variation of the KPI of interest for user end devices with a particular CQI. The time-series mode can be generated by utilizing different methods such auto-regressive (AR), ARIMA or deep-learning long short-term memory (LSTM) models.

Figure 2F:
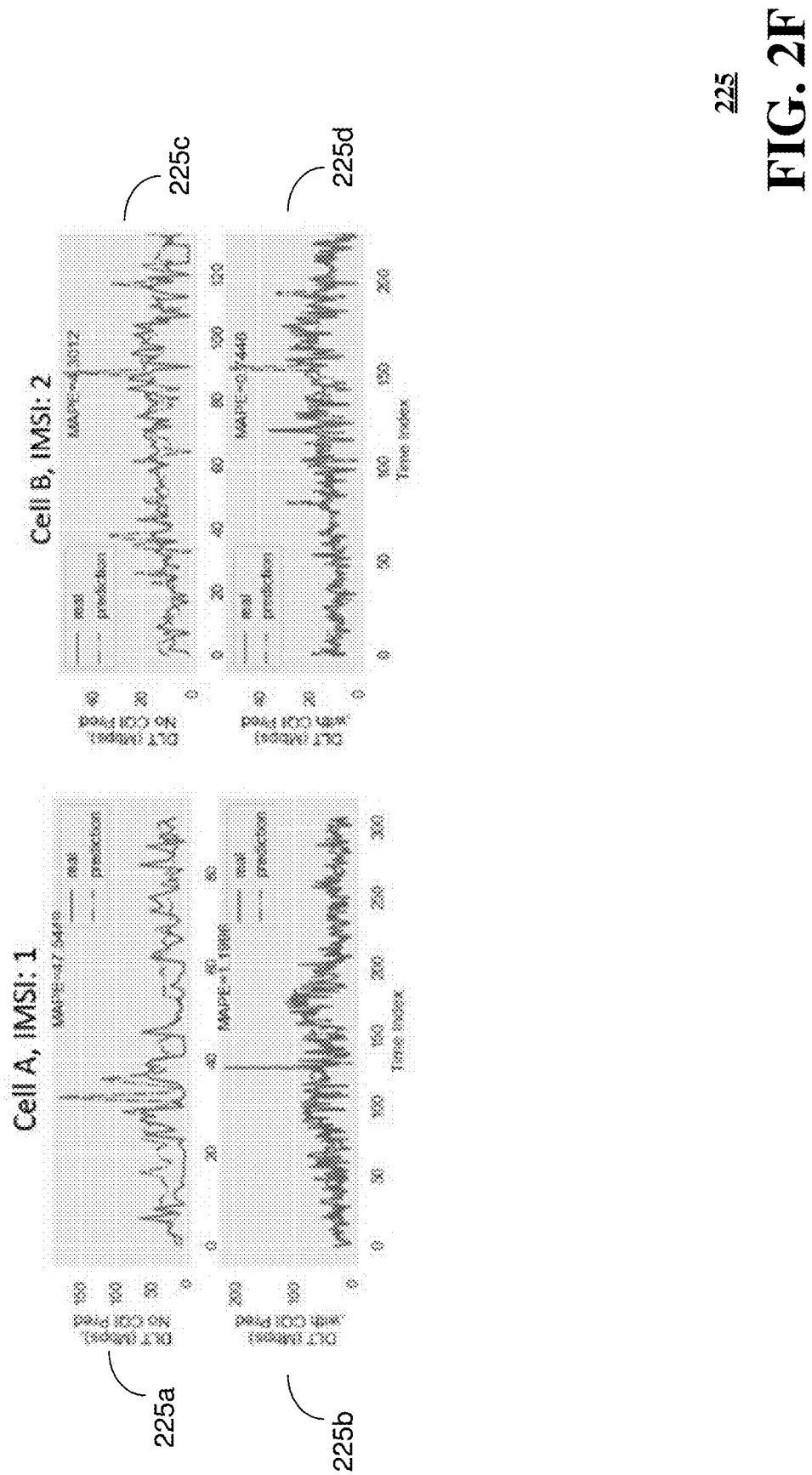

Referring to FIG. 2F, in one or more embodiments, system 225 comprises chart 225a, chart 225b, chart 225c, and chart 225d. These charts are an example of the results the techniques of FIG. 2E were used for predicting the Downlink Throughput (DLT). In some embodiments, CQI prediction can significantly improve the prediction performance as Mean Absolute Percentage Error (MAPE) have been reduced when CQI prediction has been used (e.g., comparing chart 225a with chart 225b and comparing chart 225c with chart 225d).

The above-mentioned embodiments are significant in generating KPI prediction because the prediction models are built, in a custom fashion, for each mobile network entity. Accordingly, they are scalable in large-scale networks with tens of millions of users. It should be mentioned that cell clustering and user clustering (e.g., generating mobile network entities) can be done in different ways. For example, cells can be clustered based on cell configuration parameters such as location, transmit power, antenna azimuth, eNB/gNB type/model, environment type, etc. In addition to CQI, user end devices can be clustered based on different parameters such as phone type/model, QoS Class Identifier (QCI), or other KPIs (e.g. RSRP/RSRQ, Timing Advance, etc.).

In one or more embodiments, because the KPI values are observed for some user end devices in each cell/base station, per user KPIs can be collected over time and the KPI prediction engine 205t can use the temporal correlation for each or selected group of user end devices. Accordingly, Short-Term Predictor 205m and Long-Term Predictor 205k can be generated in different ways. In some embodiments, the Short-Term Predictor 205m and Long-Term Predictor 205k can generated with predictor models for each mobile network entity, store the predictor models (e.g., coefficients of an AR/ARIMA model or parameters of a LSTM model) in the storage module 205g and use any of the predictor models when a request is received with historical data available in the storage module 205g. In other embodiments, the KPI prediction engine 205t can use matrix factorization and completion techniques to generate KPI predictions (e.g., Short-Term, Long-Term, etc.) for a mobile network entity.

Figure 2G:
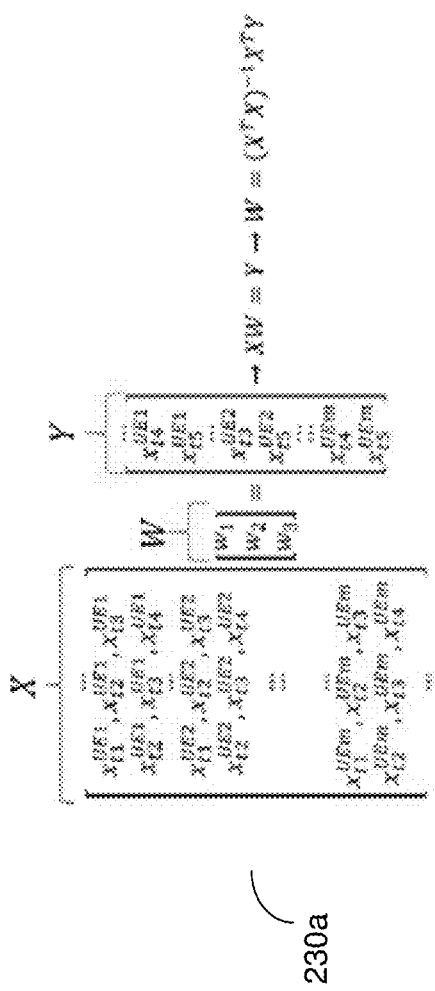

Referring to FIG. 2G, in one or more embodiments, the KPI prediction engine 205t can utilize a least square estimator for KPI prediction using historical data available for a mobile network entity. System 230 shows a least square estimator 230a implementation in which there are four historical data for a group of user end devices, namely Ue1, . . . , UEm. Then in the training phase, the KPI prediction engine 205t forms the matrix X and computes the coefficients vector W. Forming the linear set of equations XW=Y, the least square estimator 230a can estimate W for example as $W=(X^TX)^{-1} X^TY$. While calculating the KPI prediction when a request is received at time t, the KPI prediction engine 205t can use the historical data of the end user devices (denoted by vector X(t), where for example $X(t)=[x_{t1}^{UEk}, x_{t2}^{UEk}, x_{t3}^{UEk}]$) to calculate the KPI prediction in the next time period as: X(t+1)=WX(t). Without loss of generality, such an estimator can be built for per minute aggregated KPI for each mobile network entity bin such as the CQI bin. In such an embodiment there may be different vectors W for each bin associated with each mobile network entity.

Figure 2H:
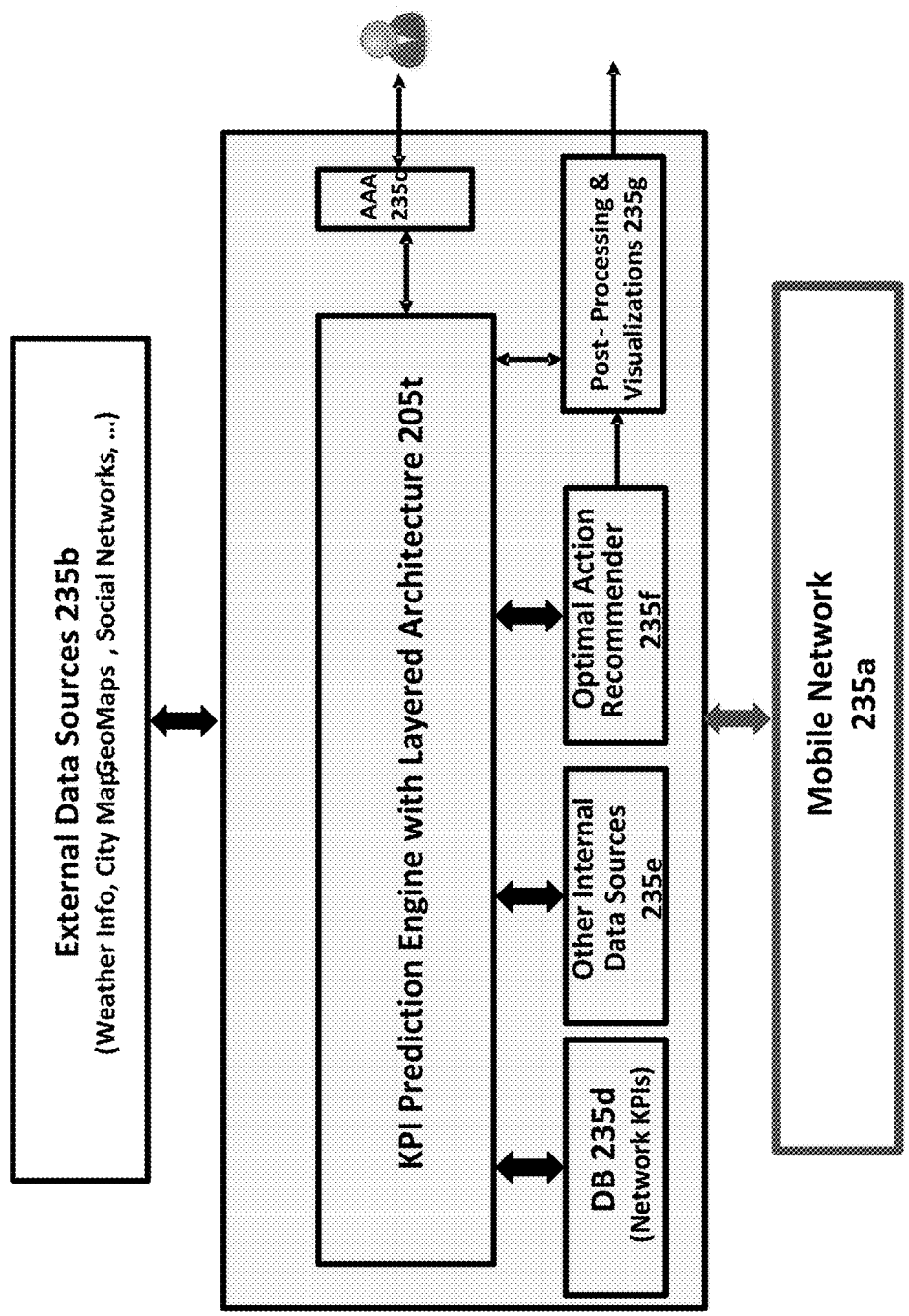

Referring to FIG. 2H, in one or more embodiments, system 235 can comprise the KPI prediction engine 205t communicatively coupled to a database 235d that stores network KPIs, other internal data sources 235e, an optimal action recommender engine 235f, post-processing and visualization module 235g, and an Authentication, Authorization, and Accounting (AAA) module 235c. Further, the KPI prediction engine 205t can be communicatively coupled to external data sources such as weather information databases, map/GPS information databases, social network websites, etc. In addition, the KPI prediction engine 205t can be communicatively coupled to one or more mobile networks 235a.

In one or more embodiments, a mobile network entity can provide request after an appropriate authorization/authentication via the AAA module 235c. The KPI prediction engine 205t can use data from the database 235d and other internal data sources 235e. Further, one or more KPI predictions can be processed, visualized and distributed to the users via post-processing and visualization module 235g. That is, the post-processing and visualization module 235g can comprise of a portal, GUI, or API to present the KPI predictions to mobile operator personnel. The optimal action recommender engine can be a smart module that can determine the allocation of network resources using ML/AI techniques. This module uses historical data to construct the best action based on the KPI prediction(s).

In one or more embodiments, reliable data/content delivery in mobile networks (e.g., LTE, 5G, etc.) requires the ability to predict the channel quality/stability, the resources required for a user end device or available resources in a cell/base station, in near real-time. Such capabilities are important in applications of Open Radio Access Network (ORAN) and RAN Intelligent Controller (RIC) in which mobile operators and users have more control on the operation of network equipment/user end devices and enables them to make smarter decisions based on the accurate prediction of the channel quality, required throughput and available bandwidth, in near real-time. Performing such actions based on reported UE measurement reports are not effective as UE measurement reports (e.g. CQI, RSRP, RSRQ) or other KPIs (throughput, delay, latency, etc.) from UEs to base stations experience transmission delays that make resource allocation/scheduling challenging/ineffective in mobile networks with highly dynamic environments.

In one or more embodiments, the multilayered KPI prediction engine can be used to predict the KPIs for mobile network entities, for example the CQI for a future time period (as a KPI that indicates channel quality), per user end device throughput and/or next available bandwidth for a cell/base station. Accordingly, resources of the underlying communication network (e.g. Physical Resource Blocks (PRBs)) can be optimally allocated or the data volume can be adjusted or the time/location of transferring data/content to a user end device can be re-scheduled.

In one or more embodiments, predicting the channel quality (e.g. CQI) per user end device can also be important in UE localization applications as mobile users tend to experience more variable CQIs. Accordingly, the CQI value and deviations between currently measured CQI and its prediction can be an indication of the mobility/stationarity of a user end device. Such information can be used as features in training/developing accurate ML models for UE localization.

In one or more embodiments, predicting the throughput and channel quality can also be used in the adaptive power adjustment and beamforming of MIMO communication systems where user end devices that experience weak channel quality can be proactively assigned with more power and narrower beam pattern. In other embodiments, user end devices that experience weak channel quality can be proactively handed over to neighbor cells/base stations with the capability of providing better channel quality.

Figure 2I:
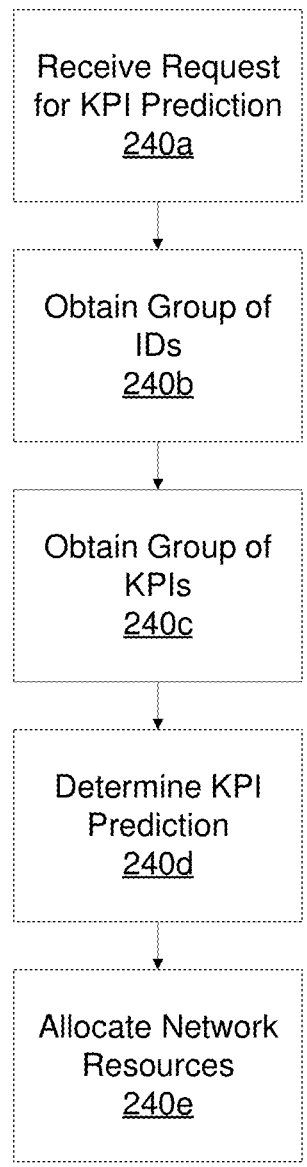
FIGS. 2I-2J depicts illustrative embodiments of methods in accordance with various aspects described herein.
Figure 2J:
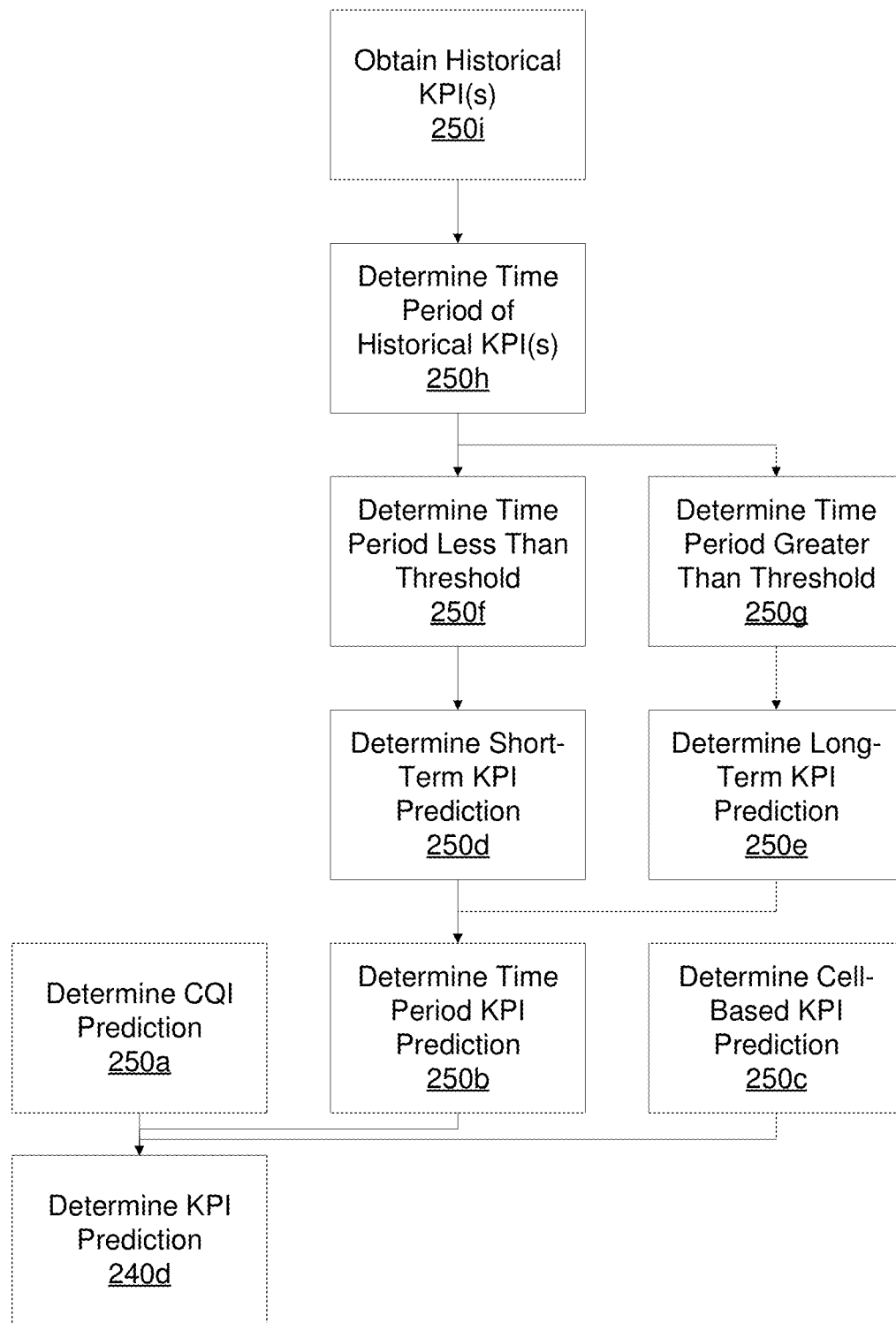

FIGS. 2I-2J depicts illustrative embodiments of methods in accordance with various aspects described herein. Referring to FIG. 2I, one or more embodiments, aspects of method 240 can be implemented by a network device comprising a KPI prediction engine. The method 240 can include the network device, at 240a, receiving a request from a mobile network entity, over a portion of a mobile network, for a key performance indicator (KPI) prediction. The mobile network entity can be one of a user end device, a base station, a group of user end devices, a group of base stations, or a combination thereof. Further, the method 240 can include the network device, at 240b, obtaining a group of identifiers associated with the mobile network entity. The group of identifiers can comprise a group of International Mobile Subscriber Identities (IMSIs), group of international mobile equipment identities (IMEIs), group of physical cell identifiers, group of extended cell global identifiers (ECGIs), or a combination thereof. In addition, the method 240 can include the network device, at 240c, obtaining a group of KPIs associated with the mobile network entity based on the group of identifiers. The group of KPIs comprises a group of channel quality indicators (CQIs), a group of signal strength indicators, a group of reference signal receive power (RSRP) indicators, a group of reference signal receive quality (RSRQ) indicators, a group of signal to noise ratio (SNR) indicators, a group of signal to interference and noise ratio (SINR) indicators, a group of physical uplink shared channel (PUSCH) SINR indicators, a group of physical uplink control channel (PUCCH) SINR indicators, distance between a user end device and a base station, or a combination thereof. Also, the method 240 can include the network device, at 240d, determining a KPI prediction associated with the mobile network entity based on the group of KPIs. In some embodiments, the determining of the KPI prediction can comprise determining at least one of a CQI prediction, a short-term KPI prediction, a long-term KPI prediction, and a cell-based KPI prediction. Further, the method 240 can include the network device, at 240e, allocating a group of network resources to the mobile network entity based on the KPI prediction.

Referring to FIG. 2J, in one or more embodiments, aspects of method 250 can be implemented by a network device comprising a KPI prediction engine. The method 250 can include the network device, at 240d, determining a KPI prediction associated with the mobile network entity based on the group of KPIs. Further, the method 250 can include the network device, at 250a, determining a CQI prediction associated with the mobile network entity based on the group of KPIs (or a portion thereof). In some embodiments, the determining of the KPI prediction comprises determining the CQI prediction. In addition, the method 250 can include the network device, at 250b, determining a time period KPI prediction based on the group of KPIs (or a portion thereof). In other embodiments, the determining of the KPI prediction comprises determining the time period KPI prediction. Also, the method 250 can include the network device, at 250c, determining a cell-based KPI prediction associated with the mobile network entity based on the group of KPIs (or a portion thereof). In further embodiments, the determining of the KPI prediction comprises determining the cell-based KPI prediction.

In one or more embodiments, the method 250 can include the network device, at 250d, determining a short-term KPI prediction based on the group of KPIs (or a portion thereof). In some embodiments, determining of the time period KPI prediction comprise the determining of the short-term KPI prediction. Further, the method 250 can include the network device, at 250e, determining a long-term KPI prediction based on the group of KPIs (or a portion thereof). In other embodiments, determining of the time period KPI prediction comprise the determining of the long-term KPI prediction.

In one or more embodiments, the method 250 can include the network device, at 250i, obtaining a group of historical KPIs associated with the mobile network entity. Further, the method 250 can include the network device, at 250j, determining a time period associated with the group of historical KPIs. In addition, the method 250 can include the network device, at 250f, determining that the time period is less than a first time threshold. In some embodiments, the determining of the short-term KPI prediction can be performed in response to determining that the time period is less than a first time threshold. Also, the method 250 can include the network device, at 250g, determining that the time period is greater than a second time threshold. In other embodiments, the determining of the long-term KPI prediction can be performed in response to determining that the time period is greater than a second time threshold. In additional embodiments, the first time threshold and the second time threshold can be the same. In further embodiments, the allocating of the group of network resources comprises allocating the group of network resources to the mobile network entity based on the long-term KPI prediction. In some embodiments, the allocating of the group of network resources comprises allocating the group of network resources to the mobile network entity based on the short-term KPI prediction. In other embodiments, the allocating of the group of network resources comprises allocating the group of network resources to the mobile network entity based on the CQI prediction. In additional embodiments, the allocating of the group of network resources comprises allocating the group of network resources to the mobile network entity based on the cell-based KPI prediction. In some embodiments, the determining of the KPI prediction comprises determining the KPI prediction based on the group of KPIs utilizing one or more of a group of machine learning models, a group of artificial intelligence models, or a group of time series models.

In some embodiments the determining of the KPI prediction comprises combining or fusing two or more of a CQI prediction, a short-term KPI prediction, a long-term KPI prediction, and a cell-based KPI prediction. In other embodiments, the determining of the KPI prediction comprises combining or fusing a short-term KPI prediction, a long-term KPI prediction, and a cell-based KPI prediction.

While for purposes of simplicity of explanation, the respective processes are shown and described as a series of blocks in FIGS. 2I-2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more blocks.

Portions of some embodiments can be combined with portions of other embodiments.

Figure 3:
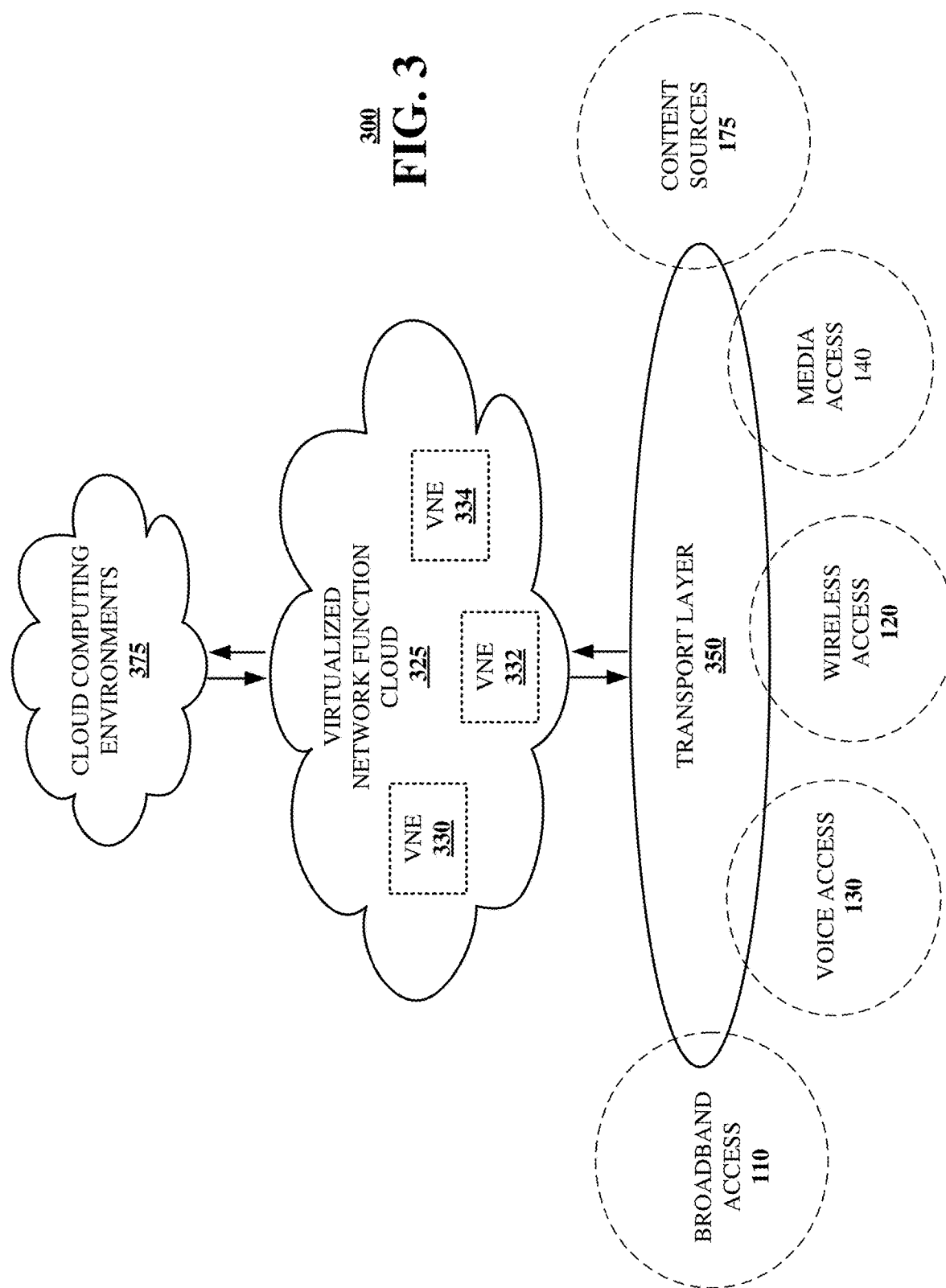
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 205, 210, 215, 220, 225, 230, and 235 and methods 240 and 250 presented in FIGS. 1, 2A-2J, and 3. For example, virtualized communication network 300 can facilitate in whole or in part determining a KPI prediction associated with a mobile network entity and allocating network resources accordingly.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
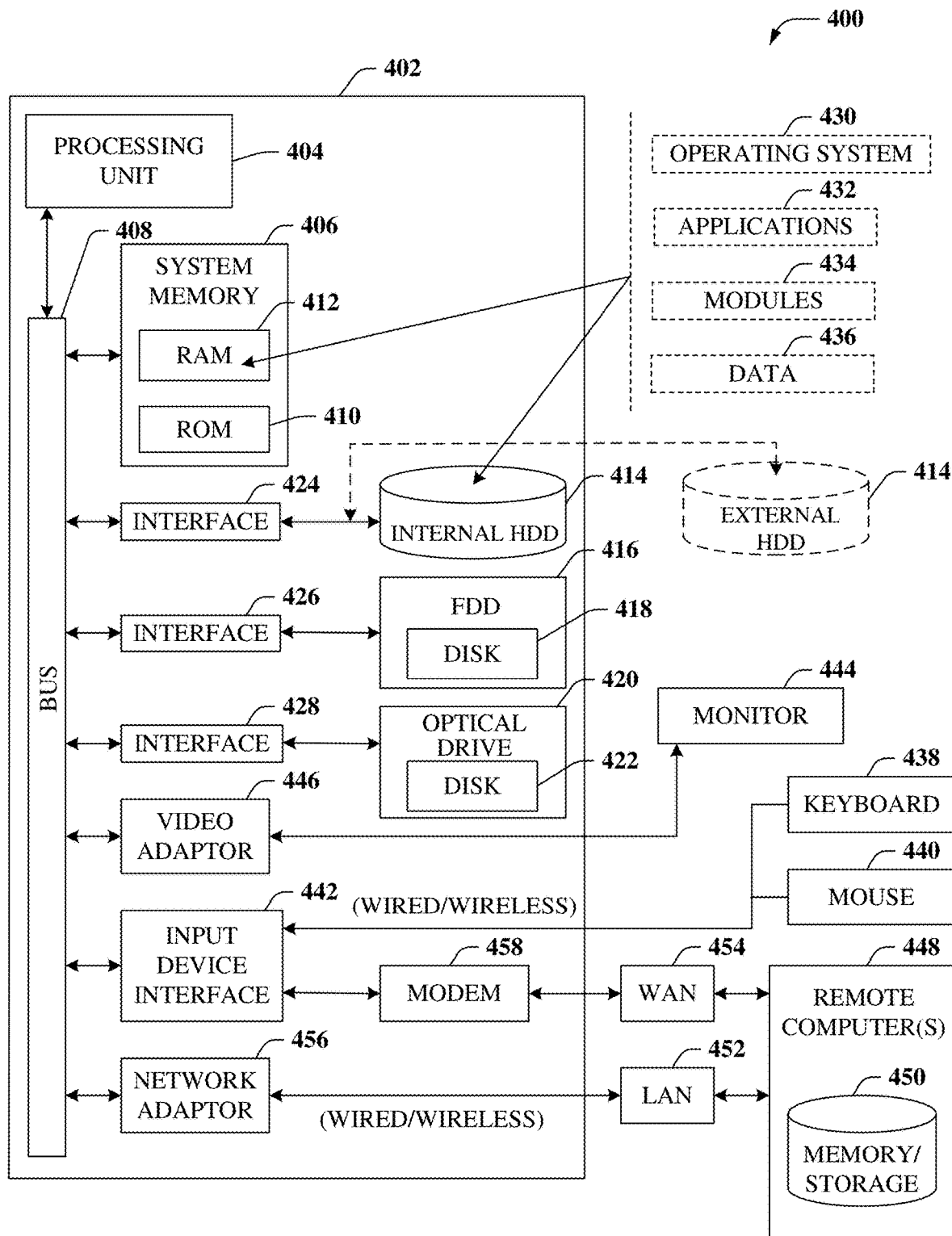
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a KPI prediction associated with a mobile network entity and allocating network resources accordingly. Each of network device 200a, base station 200c-1, base station 200c-2, base station 200c-3, user end device 200d-1, user end device 200d-2, user end device 200d-3, user end device 200d-4, user end device 200d-5, user end device 200d-6, KPI prediction engine 205t, pre-processing engine 205c, data sources database 205b, CQI predictor 205d, cell-based KPI predictor 205o, short-term predictor 205m, long-term predictor 205k, database 235d, other internal data sources 235e, optimal action recommender engine 235f, post-processing & visualizations module 235g, AAA module 235c, and external data sources 235b can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
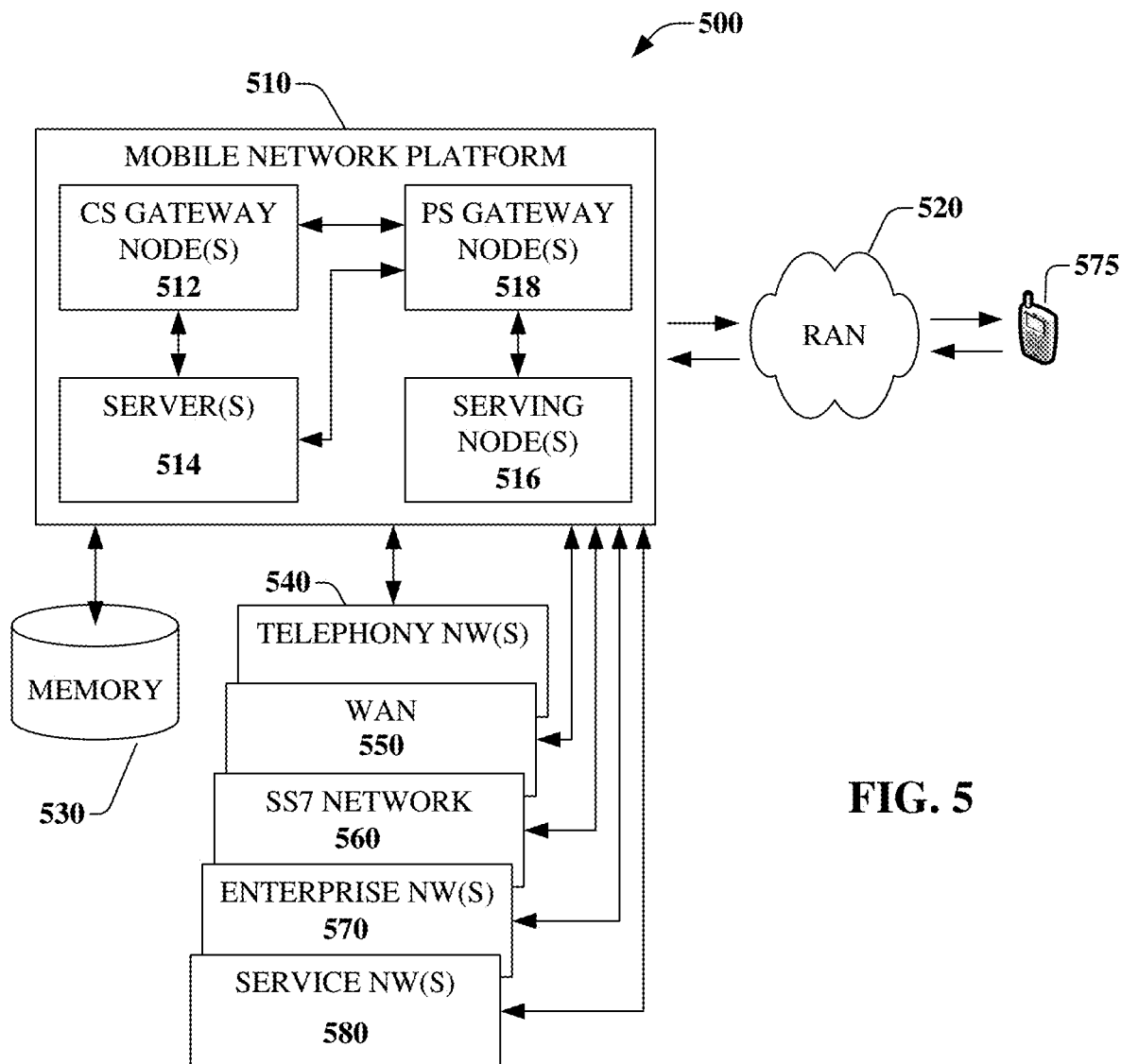
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a KPI prediction associated with a mobile network entity and allocating network resources accordingly. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
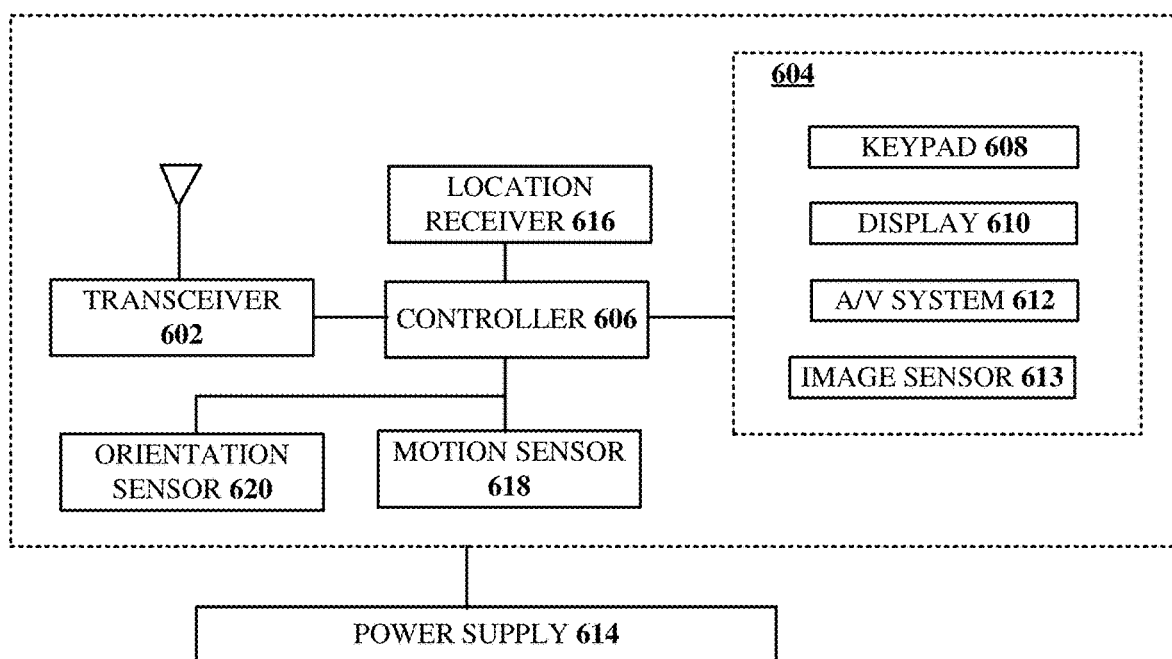
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part determining a KPI prediction associated with a mobile network entity and allocating network resources accordingly. Each of network device 200a, base station 200c-1, base station 200c-2, base station 200c-3, user end device 200d-1, user end device 200d-2, user end device 200d-3, user end device 200d-4, user end device 200d-5, user end device 200d-6, KPI prediction engine 205t, pre-processing engine 205c, data sources database 205b, CQI predictor 205d, cell-based KPI predictor 205o, short-term predictor 205m, long-term predictor 205k, database 235d, other internal data sources 235e, optimal action recommender engine 235f, post-processing & visualizations module 235g, AAA module 235c, and external data sources 235b can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a request from a mobile network entity for a key performance indicator (KPI) prediction over a portion of a mobile network;
obtaining a group of identifiers associated with the mobile network entity;
obtaining a group of KPIs associated with the mobile network entity based on the group of identifiers;
determining a KPI prediction associated with the mobile network entity based on the group of KPIs, wherein the KPI prediction is based on a short-term KPI prediction;
allocating a group of network resources to the mobile network entity based on the KPI prediction;
obtaining a group of historical KPIs associated with the mobile network entity;
determining a time period associated with the group of historical KPIs;
determining that the time period is less than a first time threshold; and
determining the short-term KPI prediction associated with the mobile network entity based on the group of historical KPIs and the determining that the time period is less than the first time threshold, wherein the allocating of the group of network resources comprises allocating the group of network resources to the mobile network entity based on the short-term KPI prediction.

2. The device of claim 1, wherein the determining of the KPI prediction comprises determining at least one of a CQI prediction, a long-term KPI prediction, and a cell-based KPI prediction.

3. The device of claim 1, wherein the mobile network entity is one of a user end device, a base station, a group of user end devices, a group of base stations, or a combination thereof.

4. The device of claim 1, wherein the group of identifiers comprises a group of International Mobile Subscriber Identities (IMSIs), group of international mobile equipment identities (IMEIs), group of physical cell identifiers, group of extended cell global identifiers (ECGIs), or a combination thereof.

5. The device of claim 1, wherein the group of KPIs comprises a group of channel quality indicators (CQIs), a group of signal strength indicators, a group of reference signal receive power (RSRP) indicators, a group of reference signal receive quality (RSRQ) indicators, a group of signal to noise ratio (SNR) indicators, a group of signal to interference and noise ratio (SINR) indicators, a group of physical uplink shared channel (PUSCH) SINR indicators, a group of physical uplink control channel (PUCCH) SINR indicators, distance between a user end device and a base station, or a combination thereof.

6. The device of claim 1, wherein the determining of the KPI prediction comprises determining the KPI prediction based on the group of KPIs utilizing one or more of a group of machine learning models, a group of artificial intelligence models, or a group of time series models.

7. The device of claim 1, wherein the KPI prediction applies to at least a smart phone and an Internet of Things (IoT) device of the mobile network.

8. The device of claim 1, wherein the KPI prediction applies to a downlink throughput and an uplink throughput.

9. The device of claim 1, wherein the KPI prediction applies to a cluster of cells.

10. The device of claim 9, wherein the cluster of cells corresponds to a cluster of base stations.

11. A non-transitory, machine-readable medium, comprising executable instructions that, when executed by a processing system including a processor, facilitate performance of operations, the operations comprising:
receiving a request from a mobile network entity for a key performance indicator (KPI) prediction over a portion of a mobile network;
obtaining a group of identifiers associated with the mobile network entity;
obtaining a group of historical KPIs associated with the mobile network entity based on the group of identifiers;
determining a KPI prediction associated with the mobile network entity based on the group of KPIs utilizing least square estimation, wherein the determining of the KPI prediction comprises combining a short-term KPI prediction, a long-term KPI prediction, and a cell-based KPI prediction; and
allocating a group of network resources to the mobile network entity based on the KPI prediction.

12. The non-transitory, machine-readable medium of claim 11, wherein the mobile network entity is one of a user end device, a base station, a group of user end devices, a group of base stations, or a combination thereof.

13. The non-transitory, machine-readable medium of claim 11, wherein the group of identifiers comprises a group of International Mobile Subscriber Identities (IMSIs), group of international mobile equipment identities (IMEIs), group of physical cell identifiers, group of extended cell global identifiers (ECGIs), or a combination thereof.

14. The non-transitory, machine-readable medium of claim 11, wherein the group of historical KPIs comprises a group of channel quality indicators (CQIs), a group of signal strength indicators, a group of reference signal receive power (RSRP) indicators, a group of reference signal receive quality (RSRQ) indicators, a group of signal to noise ratio (SNR) indicators, a group of signal to interference and noise ratio (SINR) indicators, a group of physical uplink shared channel (PUSCH) SINR indicators, a group of physical uplink control channel (PUCCH) SINR indicators, distance between a user end device and a base station, or a combination thereof.

15. The non-transitory, machine-readable medium of claim 11, wherein the determining of the KPI prediction comprises determining the KPI prediction based on the group of historical KPIs utilizing one or more of a group of machine learning models, a group of artificial intelligence models, or a group of time series models.

16. A method, comprising:
receiving, by a processing system including a processor, a request from a mobile network entity for a key performance indicator (KPI) prediction over a portion of a mobile network;
obtaining, by the processing system, a group of identifiers associated with the mobile network entity;
obtaining, by the processing system, a group of KPIs associated with the mobile network entity based on the group of identifiers;
determining, by the processing system, a CQI prediction associated with the mobile network entity based on the group of KPIs;
determining, by the processing system, a time period associated with the group of KPIs;
selecting, by the processing system, a time period predictor based on the time period from a short-term predictor and a long-term predictor resulting in a selected time period predictor;
determining, by the processing system, a time period KPI prediction associated with the mobile network entity utilizing the selected time period predictor based on the group of KPIs;
determining, by the processing system, cell-based KPI prediction associated with the mobile network entity based on the group of KPIs;
determining, by the processing system, a KPI prediction associated with the mobile network entity based on the CQI prediction, the time period KPI prediction, and the cell-based KPI prediction; and
allocating, by the processing system, a group of network resources to the mobile network entity based on the KPI prediction.

17. The method of claim 16, wherein the mobile network entity is one of a user end device, a base station, a group of user end devices, a group of base stations, or a combination thereof.

18. The method of claim 16, wherein the group of identifiers comprises a group of International Mobile Subscriber Identities (IMSIs), group of international mobile equipment identities (IMEIs), group of physical cell identifiers, group of extended cell global identifiers (ECGIs), or a combination thereof.

19. The method of claim 16, wherein the group of KPIs comprises a group of channel quality indicators (CQIs), a group of signal strength indicators, a group of reference signal receive power (RSRP) indicators, a group of reference signal receive quality (RSRQ) indicators, a group of signal to noise ratio (SNR) indicators, a group of signal to interference and noise ratio (SINR) indicators, a group of physical uplink shared channel (PUSCH) SINR indicators, a group of physical uplink control channel (PUCCH) SINR indicators, distance between a user end device and a base station, or a combination thereof.

20. The method of claim 16, wherein the determining of the KPI prediction comprises determining the KPI prediction based on the CQI prediction, the time period KPI prediction, and the cell-based KPI prediction utilizing one or more of a group of machine learning models, a group of artificial intelligence models, or a group of time series models.

* * * * *